UNITED STATES PATENT OFFICE.

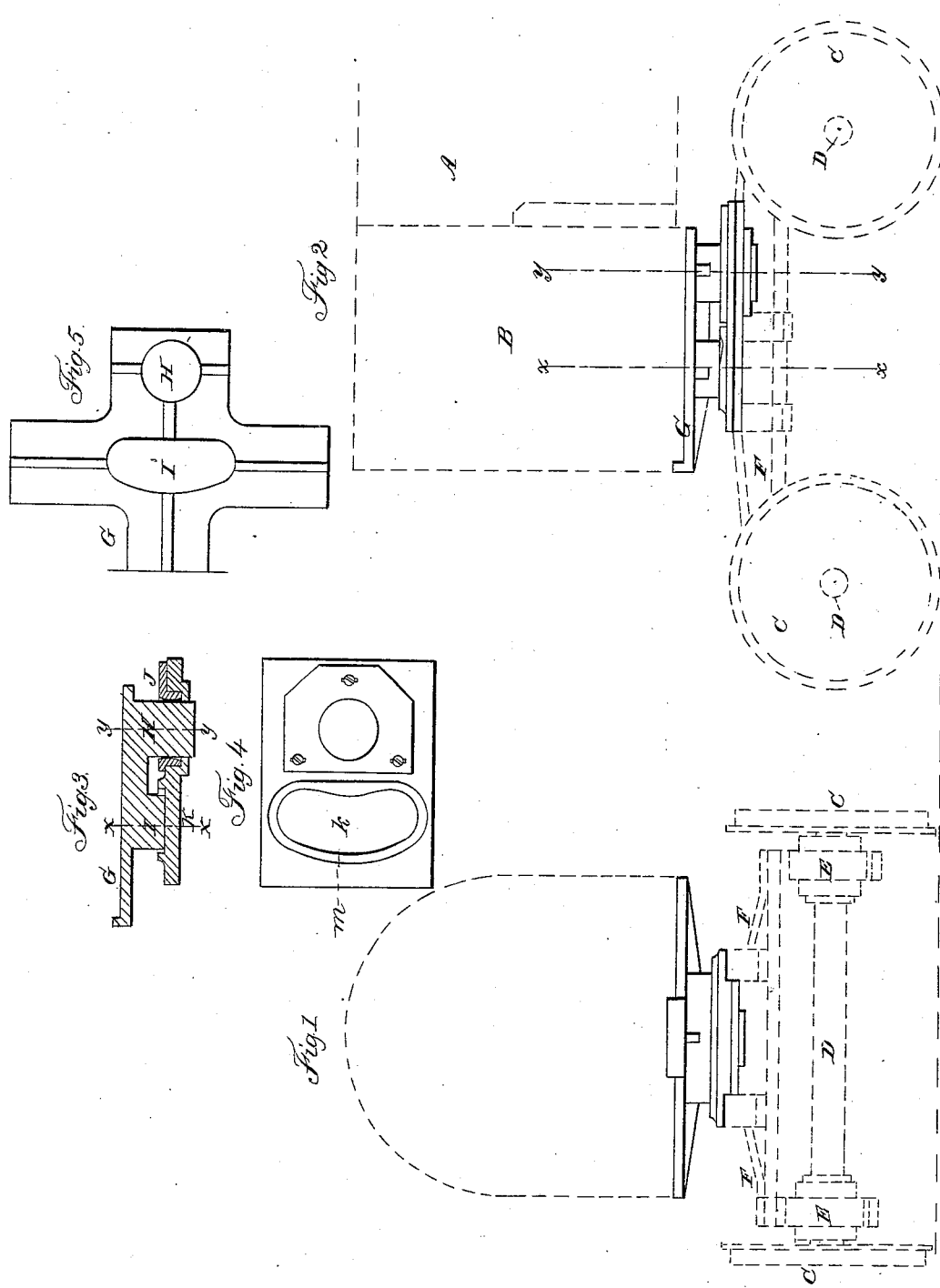

WILLIAM PETTIT, OF PHILADELPHIA, PENNSYLVANIA.

IMPROVEMENT IN CONNECTIONS OF CAR-TRUCKS.

Specification forming part of Letters Patent No. 38,980, dated June 23, 1863.

*To all whom it may concern:*

Be it known that I, WILLIAM PETTIT, of Philadelphia, Pennsylvania, have invented a Mode of Connecting Locomotives or Cars to their Trucks; and I do hereby declare the following to be a full, clear, and exact description of the same, reference being had to the accompanying drawings, and to the letters of reference marked thereon.

My invention consists in arranging the center pin which connects a locomotive or car to the truck, and on which the truck turns at a point to the rear of the center of the truck and between the two axles of the same, so that the truck may accommodate itself more readily to abrupt turns in the road, and enter the same at such an angle as to prevent a great portion of the wear and tear caused by the abrasion which takes place between the rails and wheels when the latter are connected to the ordinary trucks.

In order to enable others skilled in the art to make and use my invention, I will now proceed to describe its construction and operation.

On reference to the accompanying drawings, which form a part of this specification, Figure 1 is a front view of my improvement as applied to the truck of a locomotive-engine; Fig. 2, a longitudinal view of Fig. 1; Fig. 3, a vertical section of my improvement; Fig. 4, a plan view of the under plate, Fig. 3; Fig. 5, an inverted plan view of the upper plate, Fig. 3.

Similar letters refer to similar parts throughout the several views.

In order to describe my invention thoroughly, it will be necessary to refer to parts to which I lay no separate claim, such as the body and truck of a locomotive, which are shown in dotted lines.

A, Fig. 2, represents the rear end of the body of a locomotive-boiler, B being the smoke-box. C C are the usual railway-wheels, secured to the ordinary axles, D, which turn in suitable boxes fitted to pedestals or hangers E E, the latter being secured to the under side of the truck-frame F, which in the present instance is constructed of malleable iron, as usual with trucks connected to locomotives or tenders.

To the bottom of the smoke-box B is secured the plate G, on the under side of which are two projections, H and I, as best observed on reference to the inverted plan view, Fig. 5, the projection H consisting of a solid cylindrical pin, which fits snugly, but so as to turn freely, in an opening in the plate J, this plate being fitted and secured to another plate, K, and the latter plate being secured to the truck F of the locomotive. It should be understood that this projection H takes the place of the ordinary king-bolt or center pin, on which the front of the locomotive is allowed to turn to a limited extent when it is in the act of turning a curve on the road. It differs, however, from the ordinary center pins in this respect, that the latter are situated at a point midway between the two axles of the truck, whereas in my improvement the center pin is placed back of the center of the truck. The weight of the locomotive is received by the plate K, on which a recess, k, is formed by ribs m, the projection I of the plate G resting on the said plate K within the recess. This projection is curved, its sides forming segments of circles of which the center of the projecting pin H is the center. The same remarks apply to the flange m, which forms the boundary of the recess k. The latter, however, with its rounded ends is somewhat longer than the projection I, in order that the plate G may vibrate laterally on the projection H as a center; or, in other words, in order that the front of the locomotive may turn on the truck to an extent required by the abruptness of the curve of the road. The recess k is somewhat wider than the projection I in order that there may be no friction of that projection against the flange m. By arranging the turning-point of the truck at the rear of the center of the latter, the length of the leverage between the point where the front wheels are in contact with the rails and the center pin is so much increased that less power is required to guide the head of the truck into the curve, and there is less abrasion between the rails and the wheels than is the case where cars are secured to trucks in the ordinary manner.

The flange m, which forms the recess K, has a twofold object: First, it serves to maintain within properly-defined limits the lubricating material which is necessary for the bearing-surfaces; secondly, the ends of the recess serve as a stop to prevent the turning of the truck beyond a point which is necessary for the most abrupt curves of the road.

Although I have alluded to my invention as applied to locomotives and their trucks, it will be evident that it is equally applicable to tenders and their trucks as well as to ordinary railway-cars and their trucks.

I do not desire to claim as my invention arranging the point where the locomotive or car bears upon the truck at a distance from the center pin; but

I claim as my invention and desire to secure by Letters Patent—

Arranging the center pin which connects a car or locomotive to the truck and on which the truck turns in a position to the rear of the center of the truck and between the two axles of the same, as set forth, for the purpose specified.

In testimony whereof I have signed my name to this specification in the presence of two subscribing witnesses.

WILLIAM PETTIT.

Witnesses:
 HENRY HOWSON,
 CHARLES HOWSON